(12) United States Patent
Benmimoun et al.

(10) Patent No.: US 10,604,185 B2
(45) Date of Patent: Mar. 31, 2020

(54) METHOD FOR ASSISTING A PARKING PROCEDURE OF A MOTOR VEHICLE, ELECTRONIC PARKING ASSISTANCE SYSTEM, AND MOTOR VEHICLE

(71) Applicant: FORD GLOBAL TECHNOLOGIES, LLC, Dearborn, MI (US)

(72) Inventors: Ahmed Benmimoun, Aachen (DE); Lars Kuhnert, Cologne (DE); Georg Neugebauer, Herzogenrath (DE); Nadja Wysietzki, Cologne (DE); Ralf Brune, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 15/968,961

(22) Filed: May 2, 2018

(65) Prior Publication Data

US 2018/0334189 A1 Nov. 22, 2018

(30) Foreign Application Priority Data

May 18, 2017 (DE) .......................... 10 2017 208 385

(51) Int. Cl.
*B62D 15/02* (2006.01)
*G05D 1/02* (2020.01)
(52) U.S. Cl.
CPC ....... *B62D 15/0285* (2013.01); *G05D 1/0212* (2013.01)
(58) Field of Classification Search
CPC .......................... B62D 15/0285; G05D 1/0212
See application file for complete search history.

(56) References Cited

U.S. PATENT DOCUMENTS 8,374,749 B2   2/2013 Tanaka
9,193,387 B2 * 11/2015 Auer .................. B62D 15/0265
(Continued)

FOREIGN PATENT DOCUMENTS

DE     102009005505 A1   10/2009
DE     102015002438 A1    9/2016
(Continued)

OTHER PUBLICATIONS

DE Examination Report for DE 10 2017 208 385.9 dated Jan. 31, 2018, 7 pages.
(Continued)

*Primary Examiner* — Tyler J Lee
(74) *Attorney, Agent, or Firm* — Brooks Kushman P.C.; Frank Lollo

(57) ABSTRACT

A method for assisting a parking procedure of a motor vehicle in an available parking space. An electronic parking assistance system (EPAS) is operated to: acquire information related to a parking area having multiple parking spaces arranged adjacent and parallel to one another; generate a virtual map including positions of an available space, two flanking vehicles parked on opposed sides of the available space, and at least one additional vehicle parked alongside one of the two flanking parked vehicles on a side opposite from the available space; and determine a parking position in the available space considering the respective positions of the flanking vehicles and the additional vehicle. A vehicle steering system and/or braking system and/or powertrain is operated by the EPAS to guide the motor vehicle to the parking position.

18 Claims, 3 Drawing Sheets

(56) References Cited

U.S. PATENT DOCUMENTS

| | | | |
|---|---|---|---|
| 9,400,897 B2 | 7/2016 | Bruning et al. | |
| 9,783,231 B2 | 10/2017 | Freistadt et al. | |
| 2004/0249564 A1* | 12/2004 | Iwakiri | B62D 15/027 340/932.2 |
| 2008/0010018 A1* | 1/2008 | Satonaka | B62D 15/0285 701/300 |
| 2009/0243889 A1* | 10/2009 | Suhr | G06K 9/00812 340/932.2 |
| 2010/0204866 A1* | 8/2010 | Moshchuk | B62D 15/027 701/25 |
| 2011/0273310 A1* | 11/2011 | Kadowaki | B62D 15/0285 340/932.2 |
| 2012/0004809 A1* | 1/2012 | Sasajima | B60K 35/00 701/41 |
| 2012/0062394 A1* | 3/2012 | Pampus | B62D 15/027 340/932.2 |
| 2012/0072067 A1* | 3/2012 | Jecker | B62D 15/0285 701/25 |
| 2012/0173080 A1* | 7/2012 | Cluff | B62D 15/028 701/42 |
| 2012/0197492 A1* | 8/2012 | Schneider | B62D 15/028 701/41 |
| 2012/0316732 A1* | 12/2012 | Auer | B62D 15/0265 701/41 |
| 2013/0204540 A1 | 8/2013 | Genssle et al. | |
| 2014/0052336 A1* | 2/2014 | Moshchuk | B62D 5/0463 701/41 |
| 2016/0280263 A1* | 9/2016 | Mori | B62D 15/027 |
| 2017/0137061 A1* | 5/2017 | Azuma | B62D 15/021 |
| 2018/0095474 A1* | 4/2018 | Batur | G06K 9/4604 |
| 2018/0099661 A1* | 4/2018 | Bae | B60R 1/00 |
| 2019/0130747 A1* | 5/2019 | Kurotobi | G01S 13/931 |

FOREIGN PATENT DOCUMENTS

| | | |
|---|---|---|
| DE | 102016206757 A1 | 11/2016 |
| DE | 102015116542 A1 | 3/2017 |
| WO | 20160166086 A1 | 10/2016 |

OTHER PUBLICATIONS

Ho Gi Jung, et. al., Parking Slot Markings Recognition for Automatic Parking Assist System, Intelligent Vehicles Symposium 2006, Jun. 13-15, 2006, Tokyo, Japan, pp. 106-113.

Dr. K. Kanthamma, et al., Vacant Parking Slot Detection and Tracking—Sensor Fusion, International Journal & Magazine of Engineering, Technology, Management and Research, vol. No. 2 (2015), Issue No. 12, Dec. 2015, pp. 208-211.

* cited by examiner

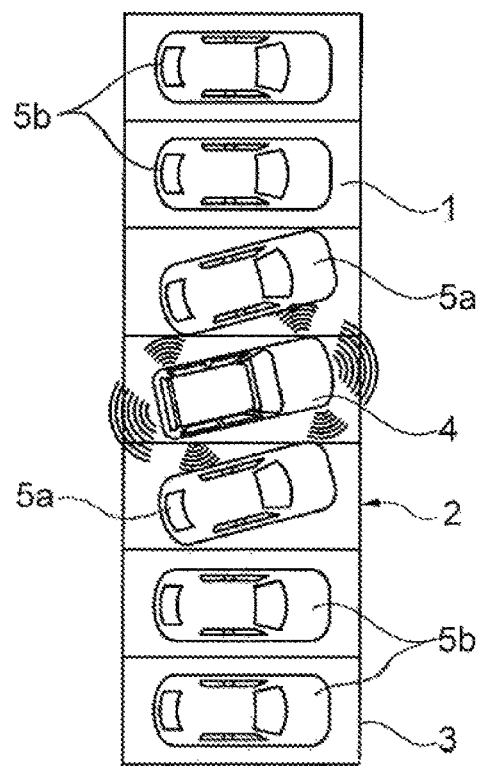
Fig. 1 - Prior Art
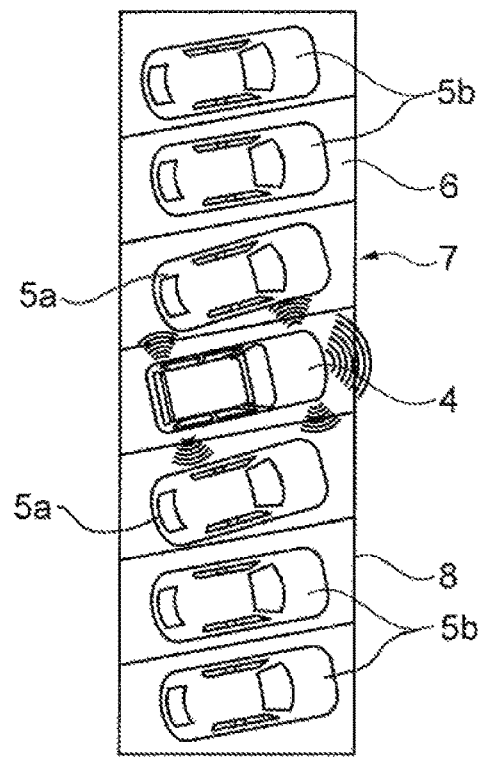
Fig. 2 - Prior Art

METHOD FOR ASSISTING A PARKING PROCEDURE OF A MOTOR VEHICLE, ELECTRONIC PARKING ASSISTANCE SYSTEM, AND MOTOR VEHICLE

CROSS-REFERENCE TO RELATED APPLICATIONS

This application claims foreign priority benefits under 35 U.S.C. § 119(a)-(d) to DE Application 10 2017 208 385.9 filed May 18, 2017, which is hereby incorporated by reference in its entirety.

TECHNICAL FIELD

The invention relates to a system and method for operating an electronic parking assistance system (EPAS) to assisting a parking procedure of a motor vehicle in an empty parking space that is flanked by multiple parallel parking spaces. The positions of multiple vehicles parked adjacent to the empty space are analyzed and considered by the EPAS to determine a parking position that is most likely to be proper.

BACKGROUND

Motor vehicles are equipped more and more frequently with driver assistance systems in the form of an electronic parking assistance system (EPAS), to assist a driver during a parking procedure. In this case, EPASs are known, which take over the steering of the motor vehicle during the parking of the motor vehicle, while the driving movements in the vehicle longitudinal direction are still controlled by the driver. In addition, EPASs are known which completely take over a parking procedure, by the EPASs taking over the steering, the braking, the acceleration, and the gear shifting. In this case, a driver monitors the parking maneuver, wherein the driver holds a button or the like pressed. If the driver releases the button, the motor vehicle is immediately stopped. Corresponding EPASs can also be controlled from outside the motor vehicle using a remote control, for example, using a smart phone or the like provided with application software. Also in this case, the driver located outside the motor vehicle actuates a, possibly virtual, button or the like during the parking maneuver, wherein the motor vehicle is immediately stopped when the driver releases or does not touch the button of the remote control.

When a driver uses an EPAS, the driver expects that the motor vehicle will assume a final parking position adapted to the alignment of the respective parking space. However, if the EPAS used is not provided with a camera, lines on the ground which frame the parking space cannot be acquired. Further, in some cases such lines are not provided. To nonetheless be able to assist a parking procedure, EPASs are known, which ascertain the final parking position in a transverse parking space or angled parking space in consideration of the two vehicles parked adjacent to the parking space. However, in some cases a vehicle is parked only on one side of the transverse parking space or angled parking space, respectively, wherein then the parking position of this vehicle is used to ascertain the final parking position of the motor vehicle.

If only the parking position(s) of the vehicle(s) parked directly adjacent to the transverse parking space or angled parking space, respectively, are taken into consideration to ascertain a final parking position of the motor vehicle by means of an EPAS, it can occur that the motor vehicle is not parked optimally within the transverse parking space or angled parking space, respectively, in particular if the directly adjacent vehicles are parked skewed or angled in the respective transverse parking space or angled parking space, respectively. It can occur in this case that the motor vehicle is parked on a boundary of the transverse parking space or angled parking space or partially outside the transverse parking space or angled parking space, respectively.

U.S. Pat. No. 9,400,897 B2 relates to a method for classification of parking scenarios for a EPAS of a motor vehicle.

U.S. Pat. No. 8,374,749 B2 discloses a EPAS, which assists the maneuvering for moving a vehicle into a reverse starting position, and then moves the vehicle in the opposite direction to the reverse starting position to a predetermined parking position.

The publication "Parking Slot Markings Recognition for Automatic Parking Assist System", Ho Gi Jung et al., Intelligent Vehicles Symposium 2006, Jun. 13-15, 2006, Tokyo, Japan, pages 106-113, discloses a monocular, vision-based parking space marking recognition algorithm, which is used for the automated selection of a final parking position by means of an EPAS.

WO 2016/166086 A1 relates to a method for signaling information to the operator of a remote control for a EPAS controllable via remote control from outside a motor vehicle for automatically parking the motor vehicle in a parking space.

DE 10 2016 206 757 A1 relates to a method for assisting a parking procedure of a motor vehicle, wherein a parking space suitable for parking the motor vehicle is determined with sensor assistance and wherein this parking space is defined by a first boundary and a second boundary.

The publication "Vacant Parking Slot Detection and Tracking—Sensor Fusion", Revathi; B. et al., Gates Institute of Technology, Gooty, Ananthapur, AP, India, December 2015, pages 208-211, discloses a system for acquiring a parking space ground marking, which can monitor the alignment and occupancy of various parking space ground markings in real time.

SUMMARY

The invention provides improvements to a parking procedure of a motor vehicle assisted using an electronic parking assistance system (EPAS).

Advantageous embodiments are given in the following description, the dependent patent claims, and the figures, wherein these embodiments can each represent a refining, in particular also preferred or advantageous, aspect of the invention per se or in various combinations of at least two of these embodiments with one another. Embodiments of the method can in this case correspond to embodiments of the EPAS and vice versa, even if reference is not explicitly made thereto hereafter in the individual case.

A method is disclosed for assisting a parking procedure of a motor vehicle in a transverse parking space and/or an angled parking space. The method generally comprises the following steps: generating a virtual map, which comprises an instantaneous parking space occupancy, of a parking area having multiple parking spaces (angled or rectilinear) arranged adjacent to one another by means of an EPAS; and ascertaining by means of the EPAS whether at least one available parking space is contained in the virtual map. If the virtual map contains an available transverse parking space, by means of the EPAS, a possible parking position of the motor vehicle in the transverse parking space is ascertained considering the acquired parking positions of at least three vehicles parked on parking spaces provided adjacent to the parking space.

According to the disclosed method, in the ascertainment of the possible parking position of the motor vehicle, at least three parking positions of vehicles parked adjacent to the available parking space are taken into consideration. In this way, not only the parking positions of vehicles that flank (i.e. are parked directly adjacent to) the available parking space, but rather additionally the parking position of at least one vehicle which is not parked directly adjacent to the available transverse parking space are taken into consideration in the ascertainment of the possible parking position of the motor vehicle. It is thus possible to avoid the possible parking position of the motor vehicle being ascertained considering an incorrect parking position or a nonoptimal parking position of a vehicle parked directly adjacent to the available transverse parking space, which could result in a nonoptimal possible parking position of the motor vehicle, in which the motor vehicle is parked, for example, on a boundary line of the available transverse parking space or partially outside the available transverse parking space, which is to be avoided. According to the invention, in the case of a correspondingly non-optimally parked vehicle in a directly adjacent transverse parking space, the parking position of the at least one additional vehicle which is not parked directly adjacent to the available transverse parking space (but rather is parked alongside one of the two flanking parked vehicles on a side opposite from the available space) is additionally taken into consideration to ascertain therefrom, for example, an average parking position of the vehicles parked in the surroundings of the transverse parking space and to use it to ascertain the possible parking position of the motor vehicle.

If the motor vehicle drives onto a parking area having transverse parking spaces, the EPAS scans the surroundings of the motor vehicle. For this purpose, the EPAS can have at least one acquisition unit in the form of a camera, a radar unit, or the like, which is connected to an analysis unit of the EPAS. The analysis unit can generate the virtual map of the parking area comprising information describing the instantaneous parking space occupancy from the surroundings information acquired using the acquisition unit. At the same time, the EPAS can ascertain distances between parked vehicles. On the basis of the map and/or the instantaneous parking space occupancy thereof, the analysis unit can ascertain whether at least one available transverse parking space is contained in the virtual map. If this is the case, the analysis unit can ascertain a possible parking position of the motor vehicle in the available transverse parking space considering the acquired parking positions of at least three vehicles parked on transverse parking spaces provided adjacent to the transverse parking space. During this ascertainment of the possible parking position of the motor vehicle, the parking positions of four or more adjacently parked vehicles can also be considered. For example, the parking positions of at least two flanking vehicles parked on each side of the transverse parking space can be taken into consideration.

The EPAS used for carrying out the method can be a system which, during a parking procedure assisted thereby, solely takes over the steering of the motor vehicle or which additionally also takes over the braking and acceleration of the motor vehicle and the gear shifting. The EPAS can be controlled and/or activated and deactivated via an operating unit inside the motor vehicle or via a remote control, for example, a smart phone, from outside the motor vehicle.

According to one advantageous embodiment, by means of the EPAS, an angular alignment of the possible parking position of the motor vehicle is ascertained considering the acquired respective angular alignments of the parking positions of the parked vehicles. Accordingly, the alignment of the parked vehicles in relation to one another and/or in relation to the alignment of the transverse parking spaces or angled parking spaces, respectively, are thus taken into consideration in the ascertainment of the angular alignment of the possible parking position of the motor vehicle.

A further advantageous embodiment provides that, by means of the EPAS, at least one lateral side-line is ascertained in relation to each parked vehicle from the instantaneous parking space occupancy, and the angular alignment of the parking position of the respective parked vehicle is ascertained in consideration of the ascertained lateral side-line. A lateral side-line is an imaginary/theoretical line which lies tangent to a vehicle at its widest point and is parallel to a longitudinal axis of the vehicle. The lateral side-line can be ascertained, for example, from distances between parked vehicles ascertained using the analysis unit of the EPAS. Both left and right lateral side-lines can also be ascertained in relation to each parked vehicle, wherein then an average alignment line or center line along a vehicle longitudinal axis of the respective vehicle can be ascertained from the two (left and right) lateral side-lines, which is then used to ascertain the angular alignment of the possible parking position of the motor vehicle.

According to a further advantageous embodiment, by means of the EPAS, the angular alignments of the parked vehicles are compared to one another and an angle average value is ascertained from those angular alignments which are in an ascertained angle range and is established as the angular alignment of the possible parking position of the motor vehicle. Accordingly, angular alignments of parked vehicles which lie outside the ascertained angle range are not taken into consideration in the ascertainment of the angular alignment of the possible parking position of the motor vehicle. In this way, angular alignment outliers are not taken into consideration, but rather only the angular alignments of the parking position of vehicles parked in a specific manner. The angle range can be ascertained by identifying angular alignment outliers and computing an angle range matching with the respective parking scenario from the remaining acquired angular alignments.

According to a further advantageous embodiment, by means of the EPAS, a longitudinal position of the motor vehicle in the possible parking position is ascertained considering the acquired longitudinal positions of the parking positions of the parked vehicles. In this way, additionally or alternatively, the longitudinal positions of the parking positions of the parked vehicles can be taken into consideration in the ascertainment of the longitudinal position, i.e., the parking depth, of the motor vehicle, to prevent the motor vehicle being parked not deep enough or excessively deep in the transverse parking space.

Advantageously, by means of the EPAS, the longitudinal positions of the parked vehicles are compared to one another and a mean value is ascertained from the longitudinal positions which are in an ascertained range and is established as the longitudinal position of the possible parking position of the motor vehicle. Accordingly, longitudinal positions of parked vehicles which lie outside the ascertained range are not taken into consideration in the ascertainment of the longitudinal position of the possible parking position of the motor vehicle. In this way, it is not longitudinal position outliers which are taken into consideration, but rather only the longitudinal positions of the parking position of vehicles parked in a specific manner. The range can be ascertained by identifying longitudinal position outliers and computing a range matching with the respective parking scenario from the remaining acquired longitudinal positions.

According to a further advantageous embodiment, it is ascertained by means of the EPAS whether a predefined safety distance of the motor vehicle to vehicles parked directly adjacent to (flanking) the motor vehicle is provided in the possible parking position. The EPAS preferably ascertains whether a required safety distance is provided on all sides of the motor vehicle when it is located in the possible parking position. In this way, a risk of collision with the adjacently parked vehicles during a parking procedure and/or departure procedure of the motor vehicle and/or the parked vehicles is reduced. If the safety distance is maintained on all sides of the motor vehicle in the possible parking position of the motor vehicle, the parking procedure can be carried out to move the motor vehicle into the possible parking position.

A further advantageous embodiment provides that, if a predefined safety distance of the motor vehicle in relation to flanking vehicles parked directly adjacent to the motor vehicle is not provided in the possible parking position, by means of the EPAS, a final parking position of the motor vehicle is ascertained by varying the possible parking position considering the predefined safety distance. Accordingly, the possible parking position of the motor vehicle is varied by means of the required safety distances in relation to all sides of the motor vehicle to ascertain a final parking position of the motor vehicle. After ascertainment of the final parking position of the motor vehicle, the parking procedure can be carried out to move the motor vehicle into the final parking position.

Furthermore, it is advantageous if a velocity of the motor vehicle is acquired and the virtual map is generated by means of the EPAS when the velocity of the motor vehicle is below a predefined velocity limit value. In this case, the EPAS can conclude in the case of a velocity of the motor vehicle lying below the velocity limit value that a parking procedure is intended and/or will occur soon. Alternatively or additionally, the EPAS can generate the virtual map after an actuation of a human-machine interface arranged inside or outside the motor vehicle.

An EPAS according to the invention for a motor vehicle comprises: at least one acquisition unit, which can be arranged on the motor vehicle, for acquiring information on the surroundings of the motor vehicle; and at least one analysis unit connected to the acquisition unit, which is configured to generate, from the information acquired using the acquisition unit, a virtual map, comprising information describing an instantaneous parking space occupancy, of a parking area having multiple transverse parking spaces arranged adjacent to one another, and to ascertain whether at least one available transverse parking space is contained in the virtual map. The analysis unit is configured, if an available transverse parking space is contained in the virtual map, to ascertain a possible parking position of the motor vehicle in the transverse parking space considering the acquired parking positions of at least three vehicles parked on transverse parking spaces provided adjacent to the transverse parking space.

The advantages mentioned above with respect to the method are accordingly linked to the EPAS. In particular, the EPAS can be used for carrying out the method according to one of the above-mentioned embodiments or an arbitrary combination of at least two of these embodiments. The acquisition unit can comprise, for example, at least one camera and/or at least one radar unit. The object information acquired by the acquisition unit includes information with respect to objects, in particular unmoving objects, located on the parking area, for example, the parked vehicles or other stationary objects. The EPAS can have sensors for acquiring the distance of the motor vehicle to objects located in the surroundings.

According to one advantageous embodiment, the analysis unit is configured to ascertain a angular alignment of the possible parking position of the motor vehicle considering the acquired angular alignments of the parking positions of the parked vehicles. The advantages mentioned above with reference to the corresponding embodiment of the method are accordingly linked to this embodiment.

A further advantageous embodiment provides that the analysis unit is configured to ascertain at least one lateral side-line in relation to each parked vehicle from the instantaneous parking area occupancy and to ascertain the angular alignment of the parking position of the respective parked vehicle considering the ascertained lateral side-line. The advantages mentioned above with respect to the corresponding embodiment of the method are accordingly linked to this embodiment.

According to a further advantageous embodiment, the analysis unit is configured to compare the respective angular alignments of the parked vehicles to one another and to ascertain an angle mean value from those angular alignments which are in an ascertained angle range and to establish it as the angular alignment of the possible parking position of the motor vehicle. The advantages mentioned above with respect to the corresponding embodiment of the method are accordingly linked to this embodiment. The angle range can be ascertained by identifying angular alignment outliers and computing an angle range matching with the respective parking scenario from the remaining acquired angular alignments.

According to a further advantageous embodiment, the analysis unit is configured to ascertain a longitudinal position of the motor vehicle in the possible parking position considering the acquired longitudinal positions of the parking positions of the parked vehicles. The advantages mentioned above with respect to the corresponding embodiment of the method are accordingly linked to this embodiment.

The analysis unit is advantageously configured to compare the longitudinal positions of the parked vehicles to one another and to ascertain a mean value from those longitudinal positions which are in an ascertained range and to establish it as the longitudinal position of the possible parking position of the motor vehicle. The advantages mentioned above with respect to the corresponding embodiment of the method are accordingly linked to this embodiment. The range can be ascertained by identifying longitudinal position outliers and computing a range matching with the respective parking scenario from the remaining acquired longitudinal positions.

According to a further advantageous embodiment, the analysis unit is configured to ascertain whether a predefined safety distance of the motor vehicle in relation to vehicles parked directly adjacent to the motor vehicle is provided in the possible parking position. The advantages mentioned above with respect to the corresponding embodiment of the method are accordingly linked to this embodiment.

According to a further advantageous embodiment, the analysis unit is configured, if a predefined safety distance of the motor vehicle in relation to vehicles parked directly adjacent to the motor vehicle is not provided in the possible parking position, to ascertain a final parking position of the motor vehicle by varying the possible parking position in consideration of the predefined safety distance. The advantages mentioned above with respect to the corresponding embodiment of the method are accordingly linked to this embodiment.

Furthermore, it is advantageous if the analysis unit is configured to acquire a velocity of the motor vehicle and to generate the virtual map when the velocity of the motor vehicle is below a predefined velocity limit value. The advantages mentioned above with respect to the corresponding embodiment of the method are accordingly linked to this embodiment.

A motor vehicle according to the invention comprises an EPAS, which is designed according to one of the above-mentioned embodiments or an arbitrary combination of at least two of these embodiments with one another.

The advantages mentioned above with respect to the EPAS or the method, respectively, are accordingly linked to the motor vehicle.

The invention will be explained by way of example hereafter with reference to the appended figures on the basis of preferred embodiments, wherein the features mentioned hereafter can each represent an advantageous or refining aspect of the invention both per se and also in different combinations of at least two of these embodiments with one another. In the figures:

BRIEF DESCRIPTION OF THE DRAWINGS

FIG. 1 shows a schematic illustration of a parking situation on a parking area having transverse parking spaces, which is obtained by means of an EPAS according to the prior art;

FIG. 2 shows a schematic illustration of a parking situation on a parking area having angled parking spaces, which is obtained by means of an EPAS according to the prior art;

DETAILED DESCRIPTION

Figure 3:
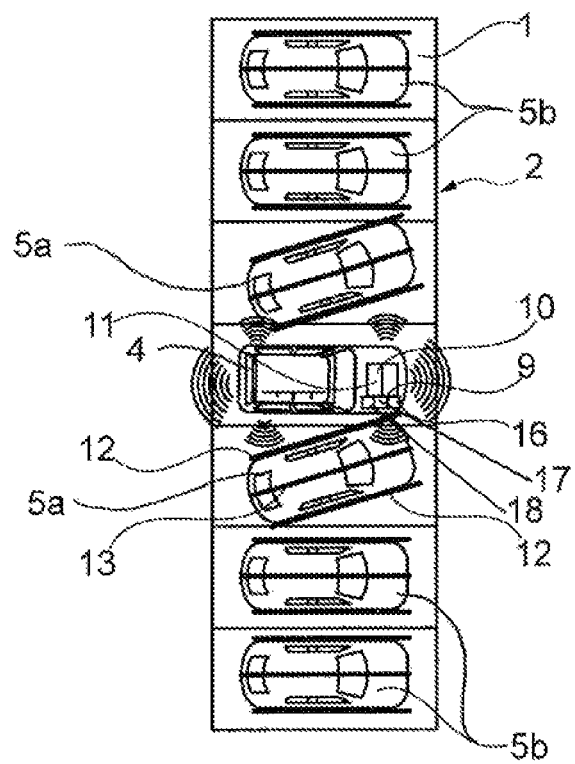
FIG. 3 shows a schematic illustration of a parking situation on a parking area having transverse parking spaces, which is obtained by means of an exemplary embodiment of a EPAS according to a disclosed embodiment of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Identical and/or functionally identical components are provided with the same reference signs in the figures.

FIG. 1 shows a schematic illustration of a parking situation on a parking area 2 having a series of mutually-parallel, right-angled parking spaces, which may be obtained by operation of a conventional EPAS (not shown) as known in the prior art. Each parking space 1 is delineated by a ground marking 3 bordering the parking space. A subject or host motor vehicle 4 is equipped with the conventionally-known EPAS and is parked on the middle parking space 1, the parking position of which as shown has been ascertained by means of the conventional EPAS. Three further vehicles 5a, 5b are parked on each side of the motor vehicle 4. The two flanking vehicles 5a parked directly adjacent to the motor vehicle 4 are parked angled or askew with respect to the respective rectangular/rectilinear/right-angled parking spaces 1 (as defined by the ground markings 3), while the remaining vehicles 5b are parked parallel/properly in the respective parking spaces 1.

The conventionally known EPAS generates a virtual map of the parking area 2 including information describing the current parking space occupancy. Further, the conventional EPAS ascertains whether at least one available parking space 1 is contained in the virtual map. If the virtual map contains an available parking space, in the illustrated case being the center space 1, the conventional EPAS ascertains the parking position shown of the motor vehicle 4 in the parking space 1 considering the detected parking positions shown for the two vehicles 5 parked directly adjacent to the available parking space 1. In this way, the conventional EPAS ascertains the parking position shown of the motor vehicle 4, in which the motor vehicle 4 is disadvantageously parked partially outside the parking space 1, as is shown in FIG. 1 and which is generally considered to be something to be avoided.

FIG. 2 shows a schematic illustration of a parking situation on a parking area 7 having a series of seven mutually-parallel and angled (as compared with the rectilinear layout of FIG. 1) parking spaces 6, which is obtained by means of a conventionally-known EPAS (not shown). Each parking space 6 is delineated by a ground marking 8 bordering the parking space 6. A subject or host motor vehicle 4 equipped with the conventionally-known EPAS is parked on the previously empty/available angled parking space 6, the parking position of which as shown has been ascertained by means of the conventional EPAS. Three further vehicles 5a, 5b are parked on each side of the motor vehicle 4. The two flanking vehicles 5a parked directly adjacent to the motor vehicle 4 are parked somewhat askew (non-parallel) with respect to their respective parking spaces 6, while the remaining vehicles 5b are parked in correct (parallel) alignment with the ground markings 8 in the respective angled parking space 6.

The conventional EPAS generates a virtual map of the parking area 7, the map comprising information describing the current parking space occupancy. Further, the conventional EPAS ascertains whether at least one empty parking space 6 is contained in the virtual map. If the virtual map contains an empty parking space 6 (in the illustrated example, the centrally-located space), the conventional EPAS ascertains the parking position shown of the motor vehicle 4 in the parking space 6 considering the acquired parking positions shown of the two vehicles 5a which flank (are parked directly adjacent to) the empty parking space 6. In this way, the conventional EPAS ascertains the parking position shown of the motor vehicle 4, in which the motor vehicle 4 is disadvantageously parked on the ground marking 8 of the parking space 6, as is shown in FIG. 2 and which is generally considered to be something to be avoided.

FIG. 3 shows a schematic illustration of a parking situation on a parking area 2 having seven parallel and rectilinear parking spaces 1 (identical to the layout of parking spaces in FIG. 1), which is obtained by means of an exemplary embodiment of an EPAS 9 according to the invention, which is installed in the host motor vehicle 4.

The EPAS 9 comprises an acquisition unit 10 (such as a camera or radar sensor, as described herein above), which is arranged on the motor vehicle 4, for acquiring information with respect to objects in the surroundings of the motor vehicle 4. Furthermore, the EPAS 9 comprises an analysis unit 11, which is connected to the acquisition unit 10 and is configured and operative to generate, from the object information acquired using the acquisition unit 10, a virtual map of the parking area 2 including information describing the presently-existing parking space occupancy shown, and to ascertain whether at least one empty parking space 1 is contained in the virtual map. The analysis unit 11 is configured, if the virtual map contains an empty parking space 1, to ascertain a possible parking position of the motor vehicle 4 in the parking space 1 considering the acquired parking positions of the flanking vehicles 5a parked immediately adjacent to the empty/available parking space and also the acquired positions of one or more of the additional vehicles 5b that are parked outboard of the flanking vehicles 5a. In the present example, the EPAS may take into consideration up to all six vehicles 5a-5b parked on the parking spaces 1 adjacent to the available parking space.

The analysis unit 11 is configured to ascertain an angular alignment of the possible parking position of the motor vehicle 4 acquired angular alignments of the respective parking positions of the parked flanking vehicles 5a and one or more of the additional vehicles 5b. For this purpose, the analysis unit 11 is configured to ascertain two (left and right) lateral side-lines 12 in relation to each parked vehicle 5a-b from the parking space occupancy map, and to ascertain the angular alignment of the parking position of the respective parked vehicle 5a-5b considering the ascertained lateral side-lines 12. For this purpose, the analysis unit 11 is configured to ascertain a center line 13 extending along the vehicle longitudinal axis of the vehicle 5a-5b from the lateral side-lines 12 in relation to a vehicle and to derive the angular alignment of the vehicle from this center line 13.

The analysis unit 11 may be operative and configured to compare the angular alignments of the respective parked vehicles 5a, 5b to one another and to ascertain an angle mean value from those angular alignments which are in an ascertained angle range and to establish it as the angular alignment of the possible parking position of the motor vehicle 4. The angle range can be ascertained by identifying angular alignment outliers and computing an angle range matching with the respective parking scenario from the remaining acquired angular alignments.

The analysis unit 11 is further configured to ascertain whether, in the possible parking position, a predefined safety distance is provided between the host motor vehicle 4 and flanking vehicles 5a parked directly adjacent to the motor vehicle 4. In this case, the analysis unit 11 is configured, if a predefined safety distance of the motor vehicle 4 in relation to flanking vehicles 5a parked directly adjacent to the motor vehicle 4 is not provided in the possible parking position, to ascertain a more acceptable parking position of the motor vehicle 5, by adjusting the possible parking position considering the predefined safety distance.

The analysis unit 11 can further be configured to acquire a velocity of the motor vehicle 4 and to generate the virtual map if the velocity of the motor vehicle 4 is below a predefined velocity limit value.

Figure 4:
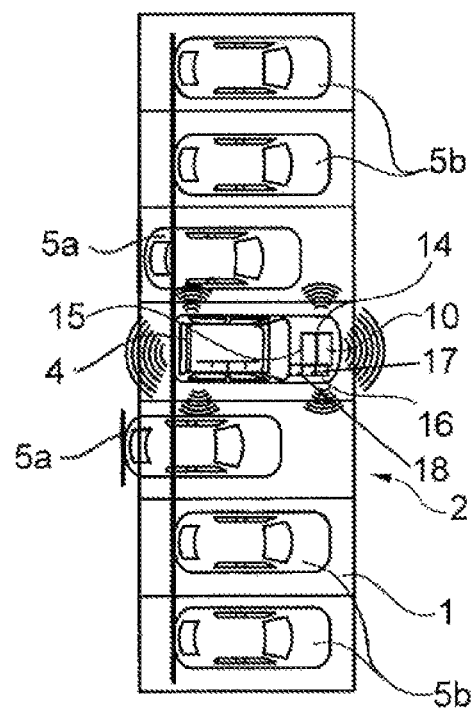
FIG. 4 shows a schematic illustration of a parking situation on a parking area having transverse parking spaces, which is obtained by means of a further exemplary embodiment of a EPAS according to a disclosed embodiment of the invention.

FIG. 4 shows a schematic illustration of a parking situation on a parking area 2 having parking spaces 1, which is obtained by means of a further exemplary embodiment of an EPAS 14 according to the invention, which is installed in the motor vehicle 4.

The EPAS 14 comprises an acquisition unit 10, arranged or mounted on the host motor vehicle 4, for acquiring object information with respect to the surroundings of the motor vehicle 4. Furthermore, the EPAS 14 comprises an analysis unit 15 connected to the acquisition unit 10, which is configured to generate, from the object information acquired using the acquisition unit 10, a virtual map of the parking area 2 (including information describing the parking space occupancy shown) and to ascertain whether at least one empty parking space 1 is contained in the virtual map. The analysis unit 15 is configured, if the virtual map contains an empty parking space, to ascertain a possible parking position of the motor vehicle 4 in the parking space considering acquired parking position of the flanking vehicles 5a and at least one of the additional vehicles 5b parked on the parking spaces adjacent to the available space.

The analysis unit 15 is configured to ascertain a longitudinal position of the motor vehicle 4 (forward/rearward, along the vehicle centerline) in the possible parking position, taking into consideration the acquired longitudinal positions of the parking positions of the parked vehicles 5. For this purpose, the analysis unit 15 is configured to compare the longitudinal positions of the parked vehicles 5 to one another and to ascertain a mean value from those longitudinal positions which are in an ascertained range and to establish it as the longitudinal position of the possible parking position of the motor vehicle 4. The range can be ascertained by identifying longitudinal position outliers and computing a range matching with the respective parking scenario from the remaining acquired longitudinal positions. For example, the flanking vehicle 5a to the right (immediately below, as depicted in FIG. 4) may be considered to be parked so far to the rear/left that its longitudinal position is an outlier and so should not be allowed to skew the mean value calculation.

The EPASs 9 and 14 shown in FIGS. 3 and 4 can be combined with one another to obtain an EPAS (not shown) which has both functionalities.

Figure 5:
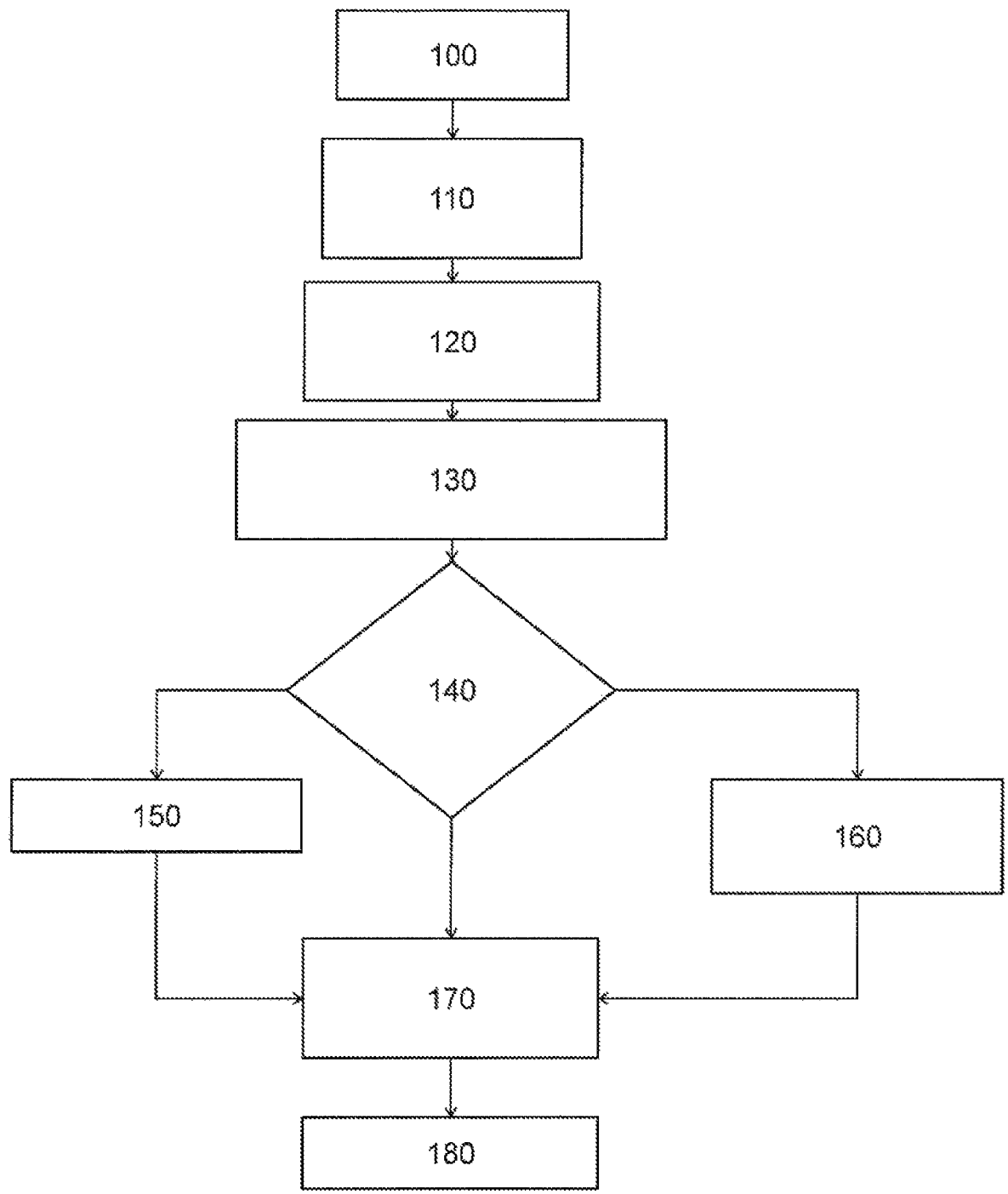
FIG. 5 shows a flow chart of an exemplary embodiment of a method according to the invention.

FIG. 5 shows a flow chart of an exemplary embodiment of a method according to the invention for assisting a parking procedure of a motor vehicle in a parking space and/or an angled parking space.

In method step 100, by means of an EPAS, object information is acquired with respect to objects present in the surroundings of the motor vehicle, in particular parked vehicles, on a parking area having multiple parking spaces arranged adjacent to one another.

In method step 110, the EPAS generates a virtual map of the parking area, the virtual map comprising information describing an instantaneous parking space occupancy. For this purpose, a velocity of the motor vehicle can be acquired and the virtual map can be generated by means of the EPAS if the velocity of the motor vehicle is below a predefined velocity limit value. Further, the EPAS ascertains whether at least one empty parking space is included in the virtual map.

In method step 120, the EPAS checks whether the empty parking space is large enough and is selected by the driver, which can be acquired, for example, via a steering procedure, a braking procedure, and/or a turn signal activation.

In method step 130, the EPAS ascertains/determines/calculates, if the virtual map contains an empty parking space, a possible parking position of the motor vehicle in the parking space in consideration of acquired parking positions of at least three vehicles parked on parking spaces provided adjacent to the parking space.

For this purpose, by means of the EPAS, a correct and well-centered angular alignment of the possible parking position of the motor vehicle can be ascertained considering the acquired angular alignments of the parking positions of the parked vehicles. Further, by means of the EPAS, at least one lateral side-line in relation to each parked vehicle can be ascertained from the instantaneous parking space occupancy and the angular alignment of the parking position of the respective parked vehicle can be ascertained considering the ascertained lateral side-line. Further, by means of the EPAS, the angular alignments of the parked vehicles can be compared to one another and an angle mean value can be ascertained from those angular alignments which are in an ascertained angle range and can be established as the angular alignment of the possible parking position of the motor vehicle. The angle range can be ascertained by identifying angular alignment outliers and computing an angle range matching with the respective parking scenario from the remaining acquired angular alignments.

Alternatively or additionally, by means of the EPAS, a longitudinal position of the motor vehicle in the possible parking position can be ascertained considering the acquired longitudinal positions of the parking positions of the respective parked vehicles. Further, by means of the EPAS, the longitudinal positions of the parked vehicles can be compared to one another and a mean value can be ascertained from those longitudinal positions which are in an ascertained range and can be established as the longitudinal position of the possible parking position of the motor vehicle. The range can be ascertained by identifying longitudinal position outliers and computing a range matching with the respective parking scenario from the remaining acquired longitudinal positions.

In method step 140, it is ascertained by means of the EPAS whether a predefined safety distance of the motor vehicle in relation to vehicles parked directly adjacent to the motor vehicle is provided in the possible parking position.

If this is the case, in method step 150, the possible parking position of the motor vehicle is established as the final parking position of the motor vehicle. If a predefined safety distance of the motor vehicle in relation to vehicles parked directly adjacent to the motor vehicle is not provided in the possible parking position, in method step 160, a final parking position of the motor vehicle is ascertained by means of the EPAS, by adjusting the possible parking position considering the predefined safety distance.

In method step 170, the parking of the motor vehicle is performed with assistance by the EPAS activating/controlling appropriate vehicle systems (such as a steering system 16, and/or braking system 17, and/or power train 18), until the motor vehicle has assumed the final parking position.

In method step 180, the parking procedure or the assistance of the parking procedure by the EPAS is ended.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating an electronic parking assistance system of a motor vehicle, comprising:
    operating an acquisition unit of an electronic parking assistance system to acquire information related to a parking area having multiple parking spaces arranged adjacent and parallel to one another;
    operating an analysis unit of the electronic parking assistance system to: a) receive from the acquisition unit information related to the parking area; b) generate therefrom a virtual map including positions of an available space, two flanking vehicles parked on opposed sides of the available space, and at least one additional vehicle parked alongside one of the two flanking parked vehicles on a side opposite from the available space; c) determine a parking position in the available space considering the respective positions of the flanking vehicles and the additional vehicle by determining a longitudinal position of the motor vehicle relative to the parking space considering respective longitudinal positions of the flanking vehicles and the additional vehicle, and (d) determine a mean value from the respective longitudinal positions of the flanking vehicles and the additional vehicle; and
    operating a vehicle steering system to guide the motor vehicle to the parking position and park at the mean value within the available space.

2. The method of claim 1, wherein the step of determining a parking position comprises determining an angular alignment of the parking position considering respective angular alignments of the flanking vehicles and the additional vehicle.

3. The method of claim 2, wherein the respective angular alignments of the vehicles are determined by ascertaining at least one lateral side-line of each vehicle.

4. The method of claim 2, wherein the analysis unit is operative to determine an angle mean value from the respective angular alignments of the vehicles.

5. The method of claim 4, wherein if one of the respective angular alignments of one of the flanking vehicles and the additional vehicle is in not within an angle range, the one of the flanking vehicles and the additional vehicle disregarded when determining the angle mean value.

6. The method of claim 1 wherein if the longitudinal position of one of the flanking vehicles and the additional vehicle extends partially outside of the parking area, the longitudinal position of the one of the flanking vehicles and the additional vehicle is disregarded when determining the mean value.

7. A method for assisting parking of a motor vehicle, comprising:
    operating a parking assistance system of the motor vehicle to 1) identify an available space between two parked vehicles, 2) detect respective positions of the two parked vehicles and of at least one additional vehicle parked alongside one of the two parked vehicles, the two parked vehicles and the at least one additional vehicle being arranged adjacent and parallel to one another, 3) determine a parking position in the available space based upon the respective positions of the two parked vehicles and the additional vehicle, each of the respective positions comprising at least one of a) an angular alignment of a longitudinal centerline of the respective vehicle, and b) a location along the longitudinal centerline of the respective vehicle, and (4) determine a mean value from the respective longitudinal positions of the parked vehicles and the additional vehicle; and activating a steering system to move the motor vehicle to the parking position, the parking position at least partially defined by the mean value.

8. The method of claim 7, wherein the parking position is determined by generating a virtual map of a parking area containing the available parking space, the parked vehicles, and the additional vehicle.

9. The method of claim 7, wherein the angular alignments of the longitudinal centerlines of the respective vehicles are determined by ascertaining at least one lateral side-line of each of the respective vehicles.

10. The method of claim 7, wherein the parking assistance system is operative to determine an angle mean value from the respective angular alignments of the vehicles; and wherein the parking position is at least partially defined by the angle mean value.

11. The method of claim 10, wherein if one of the respective angular alignments of the two parked vehicles and the additional vehicle is in not within an angle range, the one of the two parked vehicles and the additional vehicle is disregarded when determining the angle mean value.

12. The method of claim 7 wherein if the longitudinal position of one of the two parked vehicles and the additional vehicle extends partially outside of a parking area associated with the two parked vehicles and the additional vehicle, the longitudinal position of the one of the two parked vehicles and the additional vehicle is disregarded when determining the mean value.

13. A method comprising:

operating a parking assistance system of a motor vehicle to detect respective positions of three parked vehicles arranged adjacent and parallel to one another, identify an available space between two of the three parked vehicles, calculate an angle mean value of respective angular alignments of the three parked vehicles, wherein if one of the respective angular alignments of the three parked vehicles is not within an angle range, the one of the three parked vehicles is disregarded when determining the angle mean value, and determine a parking position in the available space having an angular alignment based on the angle mean value; and activating a steering system to steer the vehicle to the parking position.

14. The method of claim 13, wherein the parking position is determined by generating a virtual map of a parking area containing the available parking space and the three parked vehicles.

15. The method of claim 13, wherein the angular alignments of the three parked vehicles are determined by ascertaining at least one lateral side-line of each of the three parked vehicles.

16. The method of claim 13, further comprising operating the parking assistance system to determine the parking position by considering respective longitudinal positions of the three parked vehicles.

17. The method of claim 16, wherein the parking assistance system is further operative to determine a mean value from the respective longitudinal positions of the three parked vehicles; and wherein the parking position in the available space has a longitudinal alignment based on the mean value.

18. The method of claim 17 wherein if the longitudinal position of one of the three vehicles extends partially outside of a parking area associated with the three vehicles, the longitudinal position of the one of the three vehicles is disregarded when determining the mean value.

* * * * *